United States Patent
Lan et al.

(10) Patent No.: US 12,025,437 B2
(45) Date of Patent: Jul. 2, 2024

(54) STRETCHABLE STRAIN SENSOR BASED ON VERTICAL GRAPHENE AND ITS APPLICATION

(71) Applicant: South China University of Technology, Guangdong (CN)

(72) Inventors: Linfeng Lan, Guangdong (CN); Caihao Deng, Guangdong (CN); Junbiao Peng, Guangdong (CN)

(73) Assignee: South China University of Technology (CN)

( * ) Notice: Subject to any disclaimer, the term of this patent is extended or adjusted under 35 U.S.C. 154(b) by 0 days.

(21) Appl. No.: 17/422,693

(22) PCT Filed: Sep. 23, 2019

(86) PCT No.: PCT/CH2019/107326
§ 371 (c)(1),
(2) Date: Jul. 13, 2021

(87) PCT Pub. No.: WO2021/056150
PCT Pub. Date: Apr. 1, 2021

(65) Prior Publication Data
US 2024/0027177 A1    Jan. 25, 2024

(51) Int. Cl.
*G01B 7/00* (2006.01)
*G01B 1/00* (2006.01)
*G01B 7/16* (2006.01)

(52) U.S. Cl.
CPC ............... *G01B 7/18* (2013.01); *G01B 1/00* (2013.01)

(58) Field of Classification Search
CPC .................................... G01B 7/18; G01B 1/00
See application file for complete search history.

(56) References Cited

U.S. PATENT DOCUMENTS

| 10,557,699 B1 * | 2/2020 | Keller ................. H01R 4/5008 |
| 2010/0140723 A1 * | 6/2010 | Kurtz .................... G01L 9/0055 |
| | | 977/734 |

(Continued)

FOREIGN PATENT DOCUMENTS

JP    2020034399 A  *  3/2020 ............ B62J 45/411

OTHER PUBLICATIONS

Caihao Deng, et al ; Ultrasensitive and Highly Stretchable Multifunctional Strain Sensors with Timbre-Recognition Ability Based on Vertical Graphene; 2019; WILEY-VCH Verlag & Co. KGaA, Weinheim; Adv. Funct. Mater. WWW. afm-journal.de; pp. 1-11 (Year: 2019).*

*Primary Examiner* — Francis C Gray

(57) ABSTRACT

A stretchable strain sensor based on vertical graphene having a stretch ratio of more than 50% and is capable of recognizing timbre with frequency greater than f hertz, f being 100, 800 or 2500, and having a sensitivity factor greater than 100 at 50% stretch, wherein the vertical graphene comprises a bottom plane layer and a vertical layer and contains high-density reticular cracks, wherein the directions of the cracks can be transverse, vertical and oblique directions, wherein the reticular cracks divide the vertical graphene into a plurality of small blocks, and adjacent small blocks are electrically connected through the vertical layer in stretched state, the cracks widen, but still can be bridged by the vertical layer, the two sides of the cracks still remain electrically connected, the sensor remains effective, wherein average diameter range of the plane of each small block is between 5 and 20 microns.

10 Claims, 5 Drawing Sheets

(56) References Cited

U.S. PATENT DOCUMENTS

2019/0390950 A1* 12/2019 Lin ................... G01J 5/0853
2021/0219939 A1* 7/2021 Alshareef .......... A61B 5/02438

* cited by examiner

STRETCHABLE STRAIN SENSOR BASED ON VERTICAL GRAPHENE AND ITS APPLICATION

FIELD OF THE INVENTION

The present invention relates to the field of sensor device engineering, and in particular to a stretchable strain sensor based on vertical graphene and its application.

BACKGROUND

In the foreseeable future, the contact between the electronic equipment and human beings will become more and more frequent. The electronic equipment will get functions such as more advanced and convenient health detection, information acquisition and as a bridge between human beings and machines through more contact with human beings. Wearable devices represented by soft E-skin are emerging research hotspots in the electronic field such as electronic devices which can be directly contacted with human bodies and can be directly attached to the skins.

The traditional strain or pressure sensitive sensor is based on non-flexible materials such as piezoelectric ceramics, and the sensor cannot be stretched or compressed at will, so that it cannot be attached to the skin, and is limited in application. For example, to sense the joint movement locus of an animal or a robot, a sensor needs to be attached to a joint, and the sensor is stretched or compressed during the joint movement, in order to sense the amplitude and direction of the joint movement.

To create stretchable strain sensors, a stretchable elastic material, such as rubber, is required, but the sensitivity of the strain sensors which made of the material is limited, and the sensitivity factor (defined as the variation of the relative resistance divided by the relative deformation quantity, abbreviated as GF) is difficult to break through 100. In particular, since the Young's modulus of the elastic material is low, the natural frequency is low, and the natural frequency cannot follow the vibration frequency of the sound wave, so that the audio (or timbre) cannot be recognized, and only the intensity of the sound (volume) can be sensed at most, thereby limiting the application range.

Non-patent document 1 (Nature, 2014, 516, 222-226.doi: 10.1038/nature14002) discloses a stretchable strain sensor prepared by plating a metal film on a stretchable elastic substrate (polydimethylsiloxane, PDMS), because the metal film forms many cracks during stretching, and the audio is sensed by the change of the cracks during vibration. However, the metal film is easy to completely break during the stretching process to cause failure, and the maximum stretching amount of the sensor is only 2%, so that the practical requirement of The stretchable strain sensor are difficult to meet.

Non-patent document 2 (ACS Appl. Mater. Interfaces 2019, 11, 1294-1302. DOI: 10.1021/acsami. 8b18210) discloses strain sensors made of graphene wall, the stretch ratio is 10%, but the sensor can only sense and cannot distinguish the sound timbres.

Non-patent document 3 (ACS Appl. Mater. Interfaces, 2018, 10, 36312-36322. DOI: 10.1021/acsami. 8b15848) discloses stretchable strain sensors made from vertical graphene comprising a bottom plane layer containing zigzag cracks and a vertical layer. The cracks become widen during stretching, ande lengthening the current path and thus changing the resistance. However, such cracks are formed during the stretching process, having a low density of cracks (spacing between adjacent cracks is typically greater than 50 microns), and are directionally uniform, result in low sensitivity (maximum GF of 88.4) and are indistinguishable from the sound timbres.

Therefore, aiming at the defects in the prior art, it is necessary to provide a stretchable strain sensor with good performance and timbre recognition ability and its application to solve the defects in the prior art.

SUMMARY OF THE INVENTION

This invention aims to avoid the deficiencies of the prior art and provides a stretchable strain sensor based on vertical graphene which has high sensitivity, high natural frequency and timbre recognition ability.

The above object of the present invention is achieved by the following technical measures:
  a stretchable strain sensor based on vertical graphene is provided, which has a stretch ratio of more than 50% and is capable of recognizing timbre.

Preferably, the stretch ratio is greater than 70% and can recognize timbre.

Preferably, The stretchable strain sensor based on vertical graphene can recognize timbre that frequency greater than f hertz, f being 100, 800 or 2500.

Since the Young's modulus of the stretchable material is small and the natural frequency is low, the higher the acoustic frequency, the more difficult the stretchable strain sensor is to recognize. Therefore, the term "capable of recognizing timbre greater than a certain frequency" according to the present invention means: the highest-frequency timbre which can be recognized is greater than the frequency, and all timbre which are less than the frequency can be recognized; for example, "can recognize timbre that frequency greater than 100 Hz" means: the highest-frequency timbre that can be recognized is above 100 Hz and timbre less than 100 Hz can be recognized.

Generally, the frequency of drumming or plosive is below 100 Hz, the frequency of voice of human speaking is within the range of 100 Hz and 600 Hz, and the frequency of singing is below 1200 Hz. Therefore, the ability to recognize 100 Hz timbre means the ability to sense ambient vibrations, such as footsteps, car sounds, etc., which can be used to respond to changes in the ambient environment, as well as sense heartbeats; the ability to recognize 800 Hz timbre means the ability to identify voice of human speaking, which can be used to identify whose voice is and the spoken content; the ability to recognize 2500 Hz timbre means the ability to identify the voice of singing and the sounds produced by some instruments, which can be used to identify music.

Preferably, the above-mentioned stretchable strain sensors based on vertical graphene has a sensitivity factor greater than 100 at 50% stretch.

Preferably, the above-mentioned stretchable strain sensors based on vertical graphene has a sensitivity factor greater than 200 at 50% stretch.

Preferably, the above-mentioned stretchable strain sensor based on vertical grapheme, wherein the vertical graphene which the total thickness is 100 nanometers to 100 microns comprises a bottom plane layer and a vertical layer and contains high-density reticular cracks, the directions of the cracks comprise transverse, vertical and oblique directions, the reticular cracks divide the vertical graphene into a plurality of small blocks, and adjacent small blocks are electrically connected through the vertical layer; in the stretched state, the cracks widen, but still can be bridged by the vertical layer, the two sides of the cracks still remain electrically connected, the sensor remains effective.

Preferably, the average diameter range of the plane of each small block of the above-mentioned stretchable strain sensor based on vertical grapheme is between 5 and 20 microns.

The average diameter of the plane of the small block is defined as: the maximum length of the small block on a plane perpendicular to the thickness direction of the vertical graphene. The calculation formula of the natural frequency of the object is as follows:

$$\omega_i = \frac{(2i-1)\pi}{2l}\sqrt{\frac{E}{\rho}}; \quad (6)$$

where l is the object length, E the Young's modulus of the object, ρ the density of the object, i is a positive integer, i and is 1, 2, 3 . . . . Since most stretchable elastomers have a small Young's modulus, their natural frequency is low and cannot respond to acoustic waves. The following are found by qualitative calculation: the smaller the area of the small block, the higher the natural frequency, so high density crack (small block size is small, not more than 20 microns) is one of the necessary conditions to be able to identify the timbre.

More preferably, the average diameter range of the plane of each small block of the above-mentioned stretchable strain sensor based on vertical grapheme is between 6 and 10 microns.

Preferably, the vertical graphene of the above-mentioned stretchable strain sensor based on vertical grapheme is dissociated from the growth substrate by an ultrasonic dissociation method.

The vertical graphene of The stretchable strain sensor based on vertical grapheme is dissociated from the growth substrate by an ultrasonic dissociation method. During the ultrasonic dissociation process, high density cracks may be generated in the vertical graphene since bubble explosion may occur. The ultrasonic dissociation mode has the advantages of simplicity, high crack density and incomplete fracture. It should be noted that, in the existing dissociation method of graphene, ultrasonic wave is generally not used, because it is difficult to obtain complete graphene due to it that causes fragmentation of graphene; one of the creativity of the invention is that the 'destruction' effect of the ultrasonic wave on the graphene is just used to improve the stretch ratio, the sensitivity and the natural frequency.

It should be noted that the vertical graphene of The stretchable strain sensor based on vertical grapheme of the present invention is not limited to the preparation by the ultrasonic dissociation method, and other dissociation methods or dissociation subsequent treatments may also be suitable for preparation as long as the vertical graphene obtained can satisfy the above-mentioned crack shape and the size of the small block.

Application of The stretchable strain sensor based on vertical graphene of the present invention includes directly attaching to the skin of a pregnant woman for monitoring the heart rate of the pregnant woman or a fetus in real time. Because the heart beat of the fetus is weak and the heart beat signal needs to be transmitted outwards through the mother, sensor with high sensitivity and sound wave detection capability is needed to accurately record the state of the fetus. In addition, the sound wave detection function can also monitor states of fetal respiration, blood circulation, hiccup sounds and the like. Compared with the traditional table type fetal monitor, The stretchable strain sensor based on vertical graphene of the present invention can be directly attached to the skin of a pregnant woman, does not need to be coated with a couplant or detected by hands, and has the characteristics of convenience, comfort, continuous real-time monitoring and low cost. Signals detected by the stretchable strain sensor based on vertical graphene can also be transmitted to the mobile phone in real time, and the state of the fetus or the pregnant woman can be obtained through mobile phone program analysis. It has great help for pregnant women in late pregnancy, at high risk and with abnormal conditions. For example, if the fetus has more than three times of umbilical cord around the neck, the heart rate of the fetus needs to be measured every hour; if a table type fetal monitor is used for manual detection once every hour with the couplant coated every time, the sleep and other daily lives of the pregnant women will be seriously disturbed after 24 hours of a day; if The stretchable strain sensor based on vertical graphene is attached to the belly of a pregnant woman like a adhesive bandage, the sensor is automatically awakened to measure once every one hour without being torn off, so that the sensor is very convenient and does not disturb the pregnant woman.

The stretchable strain sensor based on vertical graphene of the present invention can be used for artificial eardrum and identifying timbre. The traditional sound sensor is rigid and stereoscopic and cannot be attached to a human body, and The stretchable strain sensor based on vertical graphene of the present invention is stretchable and elastic and is similar to an eardrum, so that The stretchable strain sensor is suitable for being used as an artificial eardrum.

The stretchable strain sensor based on vertical graphene of the present invention can be used for attaching to human skin for pulse and recognizing pulse conditions, or for sensing movement of human joints or muscles. An electronic bracelet capable of sensing pulse on the market can detect a complete pulse signal only when being worn tightly; some stretchable strain sensors also can detect complete pulse signals only when under a stretching state; since The stretchable strain sensor based on the vertical graphene of the present invention is high in sensitivity, it can detect a complete pulse signal by being attached to the wrist artery in a natural state.

The stretchable strain sensor based on vertical graphene of the present invention can be used for the skin of a robot, sensing contact or motion. The stretchable strain sensor based on vertical graphene of the present invention can be attached to a joint of a robot to sense joint movement; also can be made into gloves with touch function which can sense the contacted object and the contact pressure; also can be made into 'clothes', sensing the action, contact, sound, vibration and the like of each part of the robot.

The stretchable strain sensor based on vertical graphene of the present invention has the characteristics of high stretch ratio, high sensitivity and capability of recognizing timbre, and is wider in application compared with other stretchable strain sensors.

BRIEF DESCRIPTION OF THE DRAWINGS

The invention is further illustrated by means of the attached drawings, the content of which do not constitute any limitation of the invention.

DESCRIPTION OF THE EMBODIMENTS

The technical solution of the present invention is further described in conjunction with the following embodiments.

Embodiment 1

Figure 1:
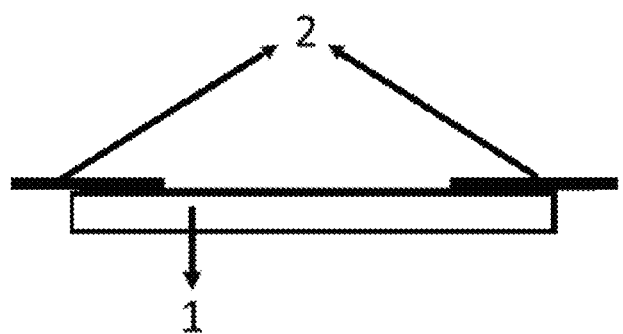
FIG. 1 is a schematic structural diagram of embodiment 1 of stretchable strain sensors based on vertical graphene of the present invention.
Figure 2:
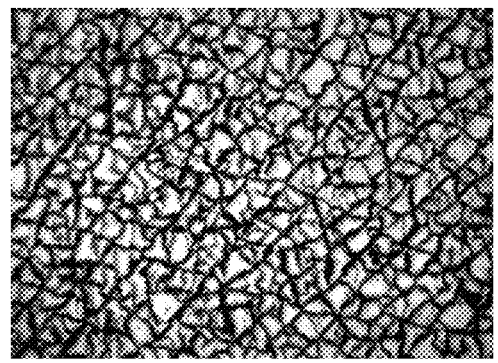
FIG. 2 is a schematic diagram of high density cracks of stretchable strain sensors based on vertical graphene of the present invention.

A stretchable strain sensor based on vertical graphene, as shown in FIG. 1, includes vertical graphene 1 and extraction electrode 2.

Wherein the vertical graphene comprises a bottom plane layer and a vertical layer, and has a total thickness of 100 nanometers-100 microns, preferably a total thickness in the range of 500 nanometers-20 microns. The vertical graphene also contains high-density reticular cracks, and as shown in FIG. 2, the directions of the cracks comprise transverse, vertical and oblique directions, that is, the cracks contain all directions. The plurality of cracks are distributed in a staggered manner, the reticular cracks divide the vertical graphene into a plurality of small blocks, and adjacent small blocks are electrically connected through the vertical layer; in the stretched state, the cracks widen, but still can be bridged by the vertical layer, the two sides of the cracks still remain electrically connected, the sensor remains effective, and it is unlikely to make the sensor inefficacy, so the sensor has great stretch ratio.

The average diameter range of the plane of each small block is not more than 20 microns, preferably in the range of 5-20 microns, which can meet the performance requirements of the sensor of the invention with respect to timbre. More preferably, the average diameter is not more than 10 microns, with the average diameter ranging from 6 to 10 microns.

The average diameter of the plane of the small block is defined as: the maximum length of the small block on a plane perpendicular to the thickness direction of the vertical graphene. The smaller the area of the small block, the higher the natural frequency, so high-density crack is the key to form the small block that size is not more than 20 microns and one of the necessary conditions to be able to identify the timbre.

Figure 3:
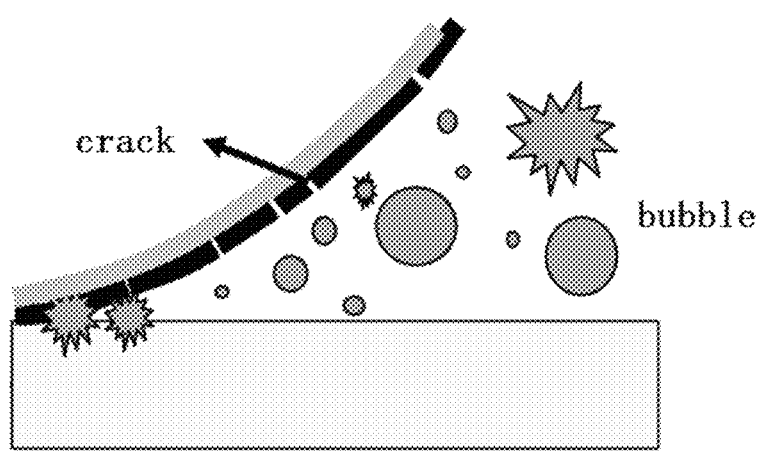
FIG. 3 is a schematic diagram of ultrasonic dissociation process during the preparation of stretchable strain sensors based on vertical graphene of the present invention.

The vertical graphene of The stretchable strain sensor based on vertical grapheme of the present invention is dissociated from the growth substrate by an ultrasonic dissociation method. During the ultrasonic dissociation process, high density cracks may be generated in the vertical graphene since bubble explosion may occur as shown in FIG. 3. The ultrasonic dissociation mode has the advantages of simplicity, high crack density and incomplete fracture. It should be noted that, in the existing dissociation method of graphene, ultrasonic wave is generally not used, because it is difficult to obtain complete graphene due to it causes fragmentation of graphene; one of the creativity of the invention is that the 'destruction' effect of the ultrasonic wave on the graphene is just used to improve the stretch ratio, the sensitivity and the natural frequency.

It should be noted that the specific process parameters adopted in the ultrasonic dissociation step are conventional ultrasonic dissociation processes, which can be obtained by those skilled in this art, and are not described herein again.

It should be further noted that the vertical graphene of The stretchable strain sensor based on vertical grapheme of the present invention is not limited to the preparation by the ultrasonic dissociation method, and other dissociation methods or dissociation subsequent treatments may also be suitable for preparation as long as the vertical graphene obtained can satisfy the above conditions of crack shape and size of the small block.

Experimental results prove that The stretchable strain sensor based on vertical graphene of the present invention does not lose effectiveness under the deformation condition that the stretch ratio is greater than 50%; more preferably, The stretchable strain sensor based on vertical graphene of the present invention does not lose effectiveness under the deformation condition that the stretch ratio is greater than 70%.

The stretchable strain sensor based on vertical graphene of the present invention can recognize the timbre with the frequency greater than 100 Hz; more preferably, timbre that frequency greater than 800 Hz can be recognized; still more preferably, timbre that frequency greater than 2500 Hz can be recognized.

The term "capable of recognizing timbre greater than a certain frequency" according to the present invention means: the highest-frequency timbre which can be recognized is greater than the frequency, and all timbre which are less than the frequency can be recognized; for example, "can recognize timbre that frequency greater than 100 Hz" means: the highest-frequency timbre that can be recognized is above 100 Hz and timbre less than 100 Hz can be recognized.

The stretchable strain sensor based on vertical graphene of the present invention has ultrahigh sensitivity, and the sensitivity factor is greater than 100 at 50% stretch; more preferably, the sensitivity factor can be greater than 200 at 50% stretch.

The stretchable strain sensor based on vertical graphene of the present invention can be directly attached to the skin of a pregnant woman for monitoring the heart rate of the pregnant woman or a fetus in real time. Compared with the traditional table type fetal monitor, The stretchable strain sensor based on vertical graphene of the present invention can be directly attached to the skin of a pregnant woman, does not need to be coated with a couplant or detected by hands, and has the characteristics of convenience, comfort, continuous real-time monitoring and low cost. Signals detected by The stretchable strain sensor based on vertical graphene can also be transmitted to the mobile phone in real time, and the state of the fetus or the pregnant woman can be obtained through mobile phone program analysis. It has great help for pregnant women in late pregnancy, at high risk and with abnormal conditions. For example, if the fetus has more than three times of umbilical cord around the neck, the heart rate of the fetus needs to be measured every hour; if a table type fetal monitor is used for manual detection once every hour with the couplant coated every time, the sleep and other daily lives of the pregnant women will be seriously disturbed after 24 hours of a day; if The stretchable strain sensor based on vertical graphene is attached to the belly of a pregnant woman like a adhesive bandage, the sensor is automatically awakened to measure once every one hour without being torn off, so that the sensor is very convenient and does not disturb the pregnant woman.

The stretchable strain sensor based on vertical graphene of the present invention can be used for artificial eardrum and identifying timbre. The traditional sound sensor is rigid and stereoscopic and cannot be attached to a human body, and The stretchable strain sensor based on vertical graphene of the present invention is stretchable and elastic and is similar to an eardrum, so that The stretchable strain sensor is suitable for being used as an artificial eardrum.

The stretchable strain sensor based on vertical graphene of the present invention can be used for attaching to human skin for pulse and recognizing pulse conditions, or for sensing movement of human joints or muscles. An electronic bracelet capable of sensing pulse on the market can detect a complete pulse signal only when being worn tightly; some stretchable strain sensors also can detect complete pulse signals only when under a stretching state; since The stretchable strain sensor based on the vertical graphene of the present invention is high in sensitivity, it can detect a complete pulse signal by being attached to the wrist artery in a natural state.

The stretchable strain sensor based on vertical graphene of the present invention can also be used for the skin of a robot, sensing contact or motion. The stretchable strain sensor based on vertical graphene of the present invention can be attached to a joint of a robot to sense joint movement; also can be made into gloves with touch function which can sense the contacted object and the contact pressure; also can be made into 'clothes', sensing the action, contact, sound, vibration and the like of each part of the robot.

Therefore, The stretchable strain sensor based on vertical graphene of the present invention has the characteristics of high stretch ratio, high sensitivity and timbre recognition ability, and is wider in application compared with other stretchable strain sensors.

Embodiment 2

Figure 4:
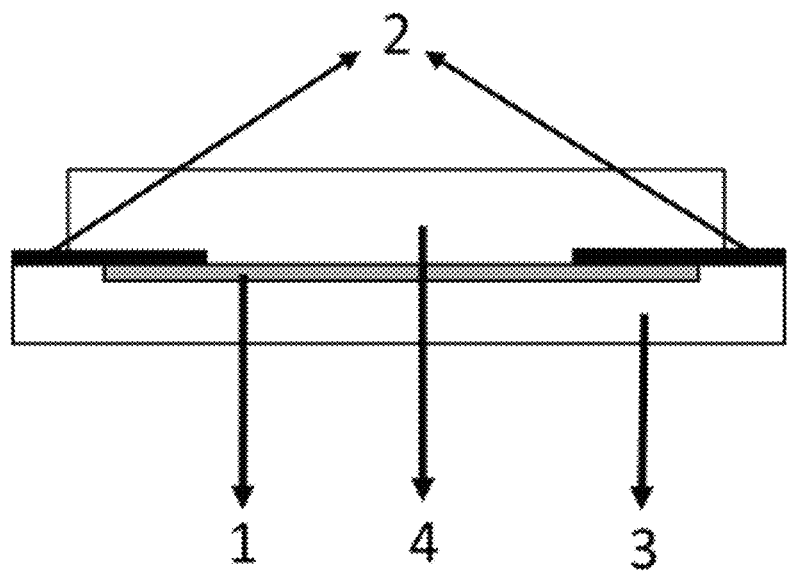
FIG. 4 is a schematic structural diagram of embodiment 2 of stretchable strain sensors based on vertical graphene of the present invention.

A stretchable strain sensor based on vertical grapheme, the other structure being the same as that of embodiment 1 except that: as shown in FIG. 4, further comprising a stretchable substrate 3 and a stretchable protective layer 4.

The preparation process of The stretchable strain sensor based on vertical grapheme comprises the following steps: firstly preparing vertical graphene 1 on a growth substrate such as a Si substrate and a Ni substrate, then pouring a stretchable material (such as PDMS) on the vertical graphene and curing the stretchable material to form a stretchable substrate 3, then placing the stretchable substrate 3/the vertical graphene 1 into an ultrasonic pool for ultrasonic dissociation, thus forming a double-layer stretchable device of the stretchable substrate 3/the vertical graphene 1, then preparing an extraction electrode 2 on one side of the vertical graphene 1 of the double-layer stretchable device of the stretchable substrate 3/the vertical graphene 1, and finally preparing a stretchable protective layer 4.

It should be noted that, in the actual preparation, the preparation steps may be adjusted according to actual requirements, for example, the extraction electrode 2 may be prepared on the vertical graphene 1 firstly, then the stretchable substrate 3 may be poured and cured, and then the ultrasonic dissociation may be performed; as another example, the device can be prepared by directly dissociating the vertical graphene 1 from the growth substrate without the stretchable substrate 3. The stretchable substrate 3 and the stretchable protective layer 4 are not essential layers of The stretchable strain sensor based on vertical grapheme of the present invention, and may be set according to the actual application requirements.

It should be further noted that the vertical graphene of The stretchable strain sensor based on vertical grapheme of the present invention is not limited to the preparation by the ultrasonic dissociation method, and other dissociation methods or dissociation subsequent treatments may also be suitable for preparation as long as the vertical graphene obtained can satisfy the above conditions of crack shape and size of the small block.

The extraction electrode 2 can be made of any conductive material and is used for connecting a power supply, the extraction electrode 2 can be bonded with the vertical graphene 1 by conductive silver paste and the like, and the electrode can be further fixed by a clamp.

The material of the stretchable substrate 3 and the stretchable protective layer 4 may be any stretchable insulating material such as polydimethylsiloxane (PDMS), hydrogenated styrene-butadiene block copolymer (SEBS), styrene-butadiene-styrene block copolymer (SBS), TPU, etc.

Experimental results prove that The stretchable strain sensor based on vertical graphene does not lose effectiveness under the deformation condition that the stretch ratio is greater than 50%; more preferably, The stretchable strain sensor based on vertical graphene does not lose effectiveness under the deformation condition that the stretch ratio is greater than 70%.

The stretchable strain sensor based on vertical graphene can recognize the timbre with the frequency greater than 100 Hz; more preferably, timbre that frequency greater than 800 Hz can be recognized; still more preferably, timbre that frequency greater than 2500 Hz can be recognized.

The stretchable strain sensor based on vertical graphene has ultrahigh sensitivity, and the sensitivity factor is greater than 100 at 50% stretch; more preferably, the sensitivity factor can be greater than 200 at 50% stretch.

The stretchable strain sensor based on vertical graphene can be directly attached to the skin of a pregnant woman for monitoring the heart rate of the pregnant woman or a fetus in real time; can be used for artificial eardrum and identifying timbre; can be used for attaching to human skin for pulse and recognizing pulse conditions, or for sensing movement of human joints or muscles; can be used for the skin of a robot, sensing contact or motion.

The stretchable strain sensor of the present embodiment has the characteristics of high stretch ratio, high sensitivity and capability of recognizing timbre, and is wider in application compared with other stretchable strain sensors.

Embodiment 3

A stretchable strain sensor based on vertical grapheme includes a vertical grapheme, an extraction electrode and a stretchable substrate.

The preparation process comprises the following steps: firstly preparing 1-micron-thick vertical graphene on a Si growth substrate by using a CVD method, then pouring a mixture of a prepolymer of PDMS and a curing agent on the vertical graphene and curing the mixture to form a stretchable substrate, then placing the stretchable substrate/the vertical graphene into an ultrasonic pool for ultrasonic dissociation (the ultrasonic frequency is 40 kHz and the power is 40 W), thus forming a double-layer stretchable device of the stretchable substrate/the vertical graphene, then preparing Cu on one side of the vertical graphene of the double-layer stretchable device of the stretchable substrate/the vertical graphene to serve as an extraction electrode, and fixing the Cu by using conductive silver paste.

The vertical graphene contains high-density reticular cracks, the directions of the cracks comprise transverse, vertical and oblique directions, namely, the cracks exist in all directions, the staggered cracks form a plurality of small blocks, and the average diameter of the plane of each small block is 5-20 microns.

Figure 5:
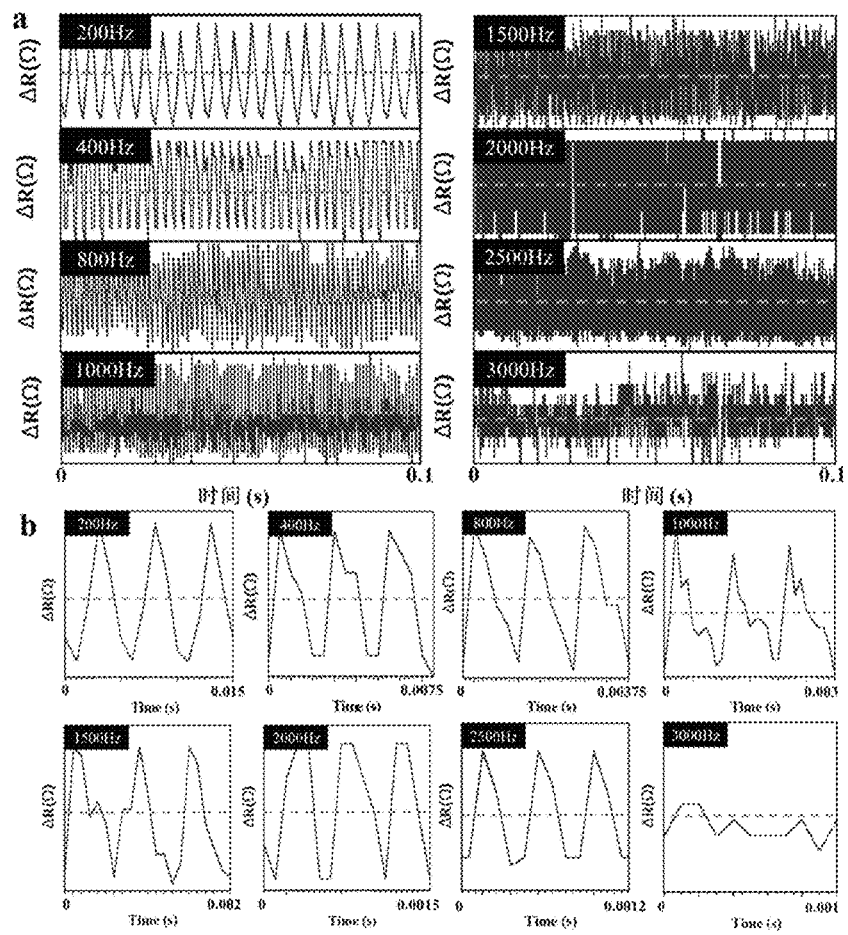
FIG. 5 is a result of the response of The stretchable strain sensor based on vertical graphene of the present invention to timbre.

The experiment results of the prepared stretchable strain sensor based on vertical grapheme can identify the timbre are shown in FIG. 5, it can be seen from the figure that the sensor of the present invention can identify the timbre frequency up to 2500 Hz.

Figure 6:
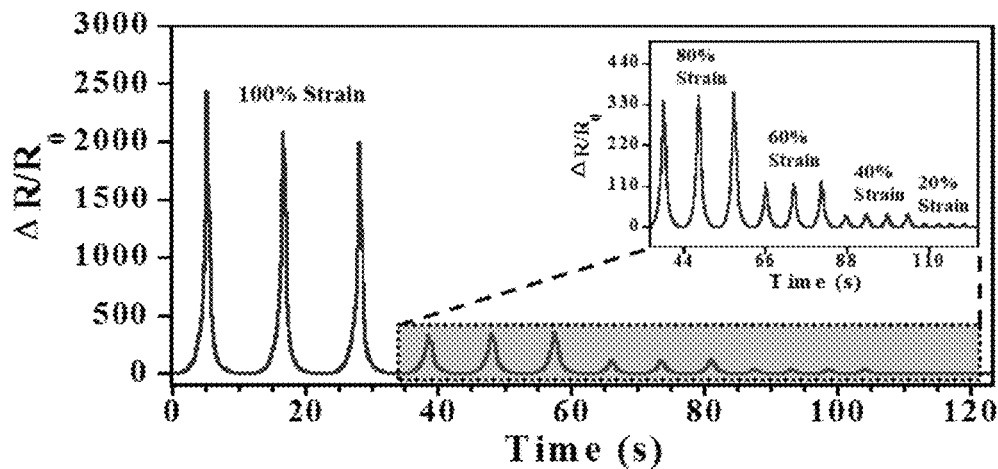
FIG. 6 is a result of the stretch ratio of The stretchable strain sensor based on vertical graphene of the present invention.

The stretch experiment results of The stretchable strain sensor based on vertical grapheme of the present invention are shown in FIG. 6. It can be seen from the experiment results that the sensor of the present invention is still stable and does not lose effectiveness when the stretch ratio is 100%, as shown in FIG. 6.

Figure 7:
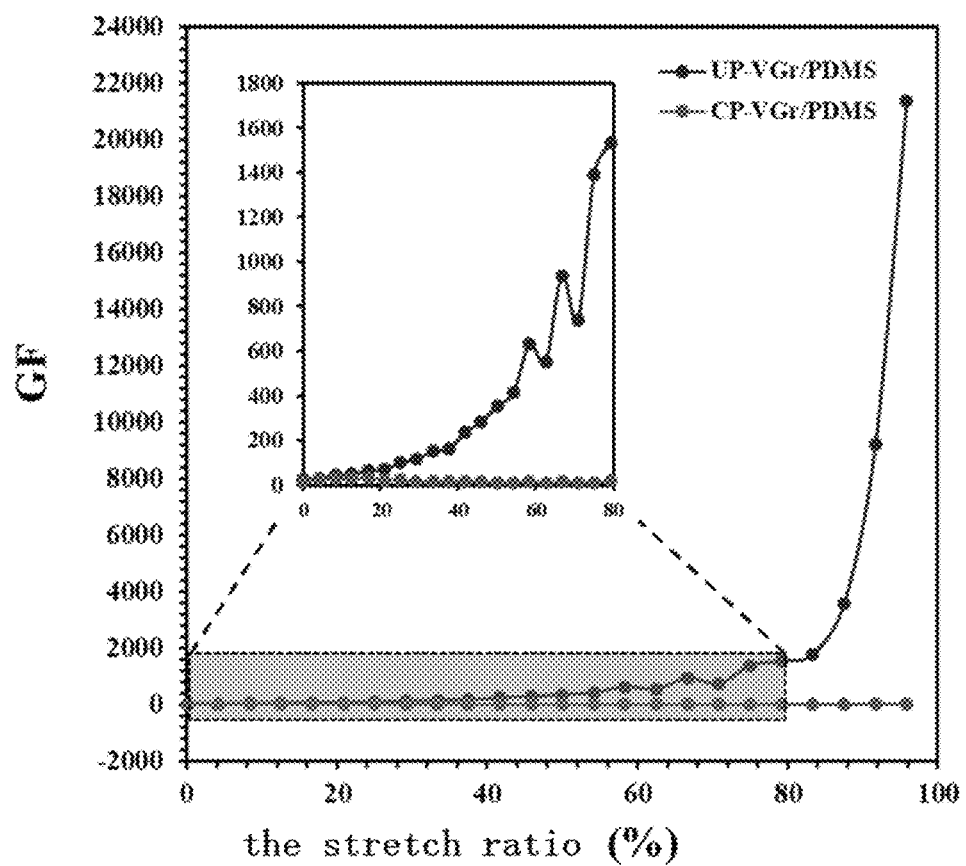
FIG. 7 is a result of the stretch ratio of the sensitivity factor of The stretchable strain sensor based on vertical graphene of the present invention at 50% stretch.

The stretchable strain sensor based on vertical graphene of the present invention has ultrahigh sensitivity, and the sensitivity factor (GF) is about 300 at 50% stretch, as shown in FIG. 7.

Figure 8:
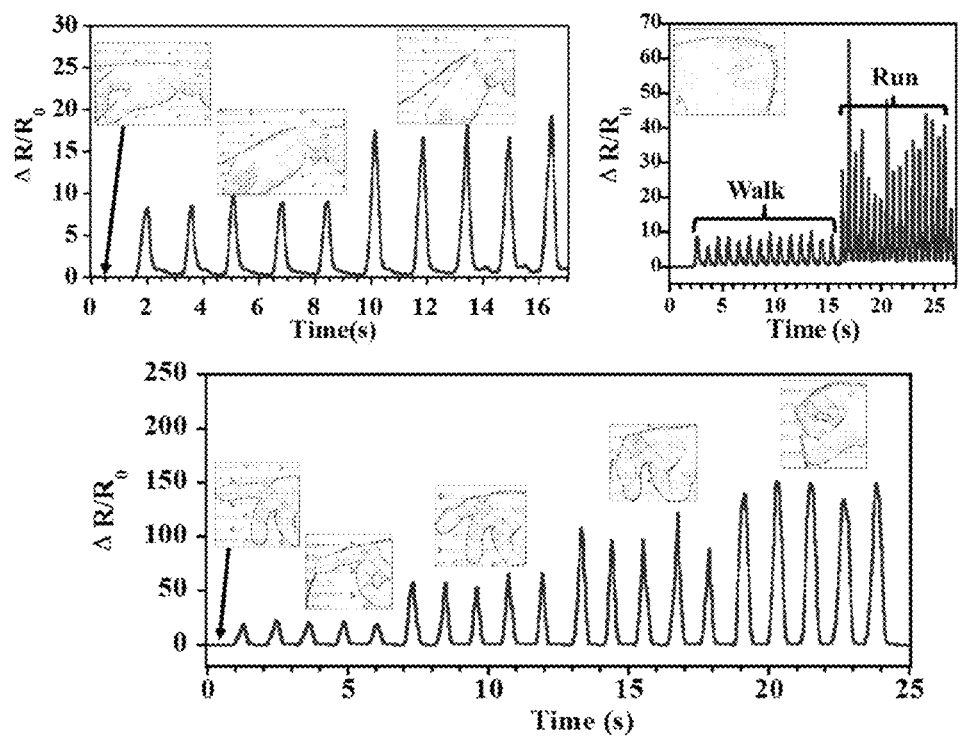
FIG. 8 is a schematic diagram of the application of The stretchable strain sensor based on vertical graphene of the present invention to be attached at a human joint.

The stretchable strain sensor based on vertical graphene of the present invention is attached to human joints, can sense the movement of a human wrist joint, a human knee joint and a human finger joint, as shown in FIG. 8, and has good sensing sensitivity.

Figure 9:
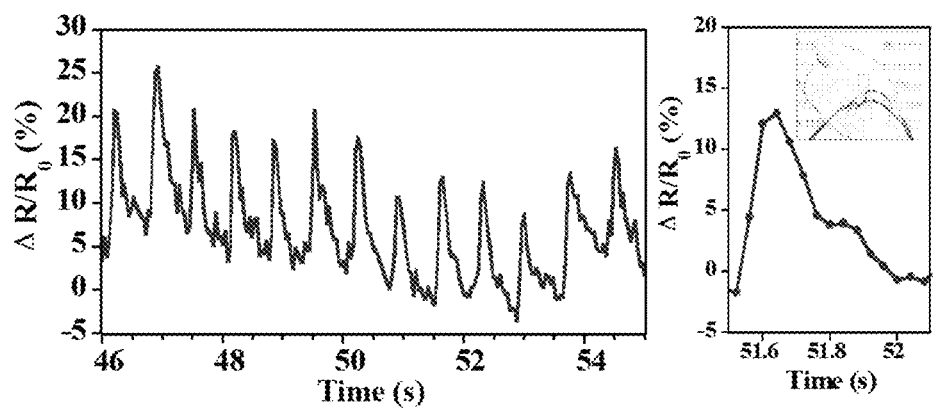
FIG. 9 is a schematic diagram of the application of The stretchable strain sensor based on vertical graphene of the present invention to be attached to the wrist artery of a human body for sensing pulse.

The stretchable strain sensor based on vertical graphene of the present invention is attached to an artery, and can sense the complete pulse signal of a human body, as shown in FIG. 9.

Embodiment 4

A stretchable strain sensor based on vertical grapheme, the other characteristic being the same as that of embodiment 1 except that: the vertical graphene 1 has a thickness of 10 microns and further includes a PDMS stretchable protective layer 4, as shown in FIG. 2.

Figure 10:
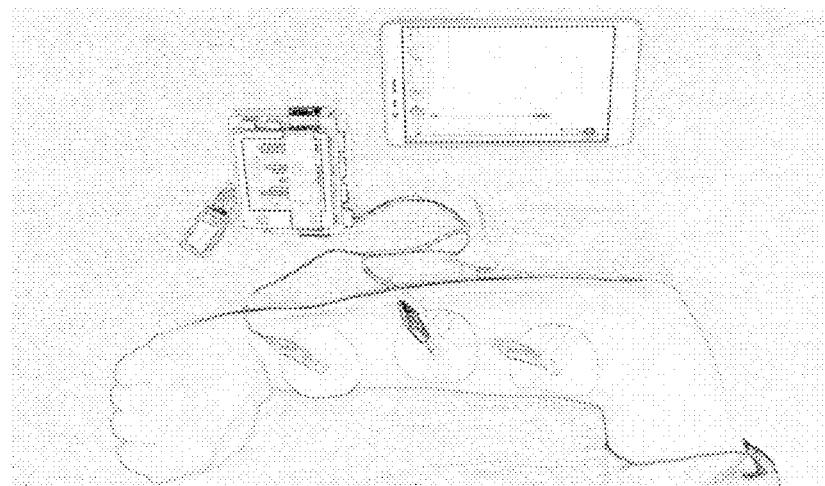
FIG. 10 is a schematic diagram of The stretchable strain sensor based on vertical graphene of the present invention attached to the skin of an arm, capable of sensing muscle contraction and transmitting signal to mobile phone.

The stretchable strain sensor based on vertical graphene is attached to the skin of an arm, capable of sensing muscle contraction and transmitting signal to mobile phone, as shown in FIG. 10.

Figure 11:
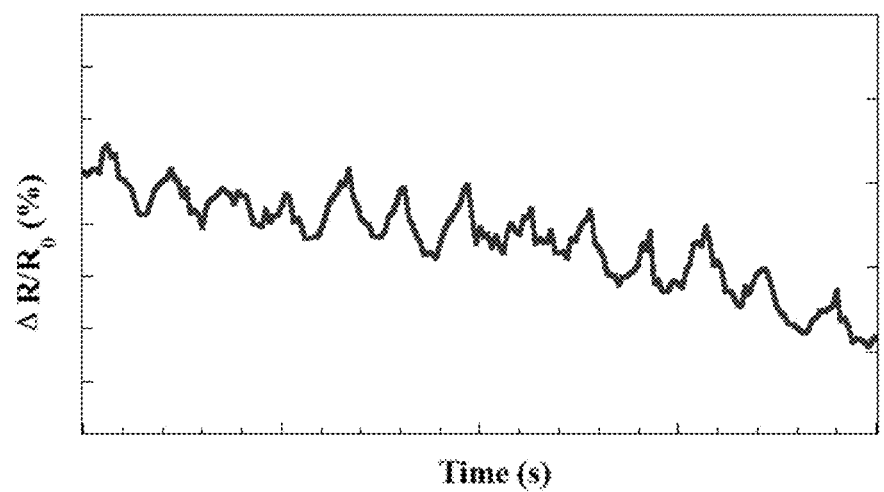
FIG. 11 is a result of The stretchable strain sensor based on vertical graphene of the present invention attached to the belly of a pregnant woman for monitoring the heart rate of the fetus in real time.

The stretchable strain sensor based on vertical graphene of the present invention is attached to the belly of a pregnant woman for monitoring the heart rate of a fetus in real time, as shown in FIG. 11. Compared with the traditional table type fetal monitor, The stretchable strain sensor based on vertical graphene of the present invention can be directly attached to the skin of a pregnant woman, does not need to be coated with a couplant or detected by hands, and has the characteristics of convenience, comfort, continuous real-time monitoring and low cost. Signals detected by The stretchable strain sensor based on vertical graphene can also be transmitted to the mobile phone in real time, and the state of the fetus or the pregnant woman can be obtained through mobile phone program analysis. It has great help for pregnant women in late pregnancy, at high risk and with abnormal conditions. For example, if the fetus has umbilical cord around the neck, the heart rate of the fetus needs to be measured every hour; if a table type fetal monitor is used for manual detection once every hour with the couplant coated every time, the sleep and other daily lives of the pregnant women will be seriously disturbed after 24 hours of a day; if The stretchable strain sensor based on vertical graphene is attached to the belly of a pregnant woman like a adhesive bandage, the sensor is automatically awakened to measure once every one hour without being torn off, so that the sensor is very convenient and does not disturb the pregnant woman.

Finally, it should be noted that the above embodiments are merely used for describing the technical scheme of the present invention, but not intended to limit the protection scope of the present invention. Although the present invention is described in detail according to preferable embodiments, those of ordinary skills in the art should understand that the technical schemes of the present invention may be modified or equivalently substituted without departing from the spirit and protection scope of the present invention.

The invention claimed is:

1. A stretchable strain sensor based on vertical graphene, wherein stretch ratio of the stretchable strain sensor is greater than 50% and is capable of recognizing timbre;
    wherein the stretchable strain sensor comprises vertical graphene and extraction electrode,
    wherein the vertical graphene comprises a bottom plane layer and a vertical layer,
    high-density reticular cracks, wherein directions of the high-density reticular cracks can be one or more of transverse, vertical or oblique, wherein the high-density reticular cracks divide the vertical graphene into a plurality of small blocks, and wherein adjacent small blocks are electrically connected through the vertical layer; wherein in stretched state, the high-density reticular cracks widen and bridged by the vertical layer, wherein two sides of the high-density reticular cracks remain electrically connected.

2. The stretchable strain sensor based on vertical graphene according to claim 1, wherein the stretch ratio is greater than 70% and is capable of recognizing timbre.

3. The stretchable strain sensor based on vertical graphene according to claim 1, wherein the timbre of frequency greater than f hertz can be recognized, wherein f being 100, 800 or 2500.

4. The stretchable strain sensor based on vertical graphene according to claim 3, wherein sensitivity factor of the stretchable strain sensor based on vertical graphene is greater than 100 at 50% stretch.

5. The stretchable strain sensor based on vertical graphene according to claim 4, wherein the sensitivity factor is greater than 200 at 50% stretch.

6. The stretchable strain sensor based on vertical graphene according to claim 1, wherein average diameter range of plane of each small block is between 5 and 20 microns.

7. The stretchable strain sensor based on vertical graphene according to claim 6, wherein the average diameter range of the plane of each small block is between 6 and 10 microns.

8. The stretchable strain sensor based on vertical graphene according to claim 7, wherein total thickness of the vertical graphene is 100 nanometers to 100 microns.

9. The stretchable strain sensor based on vertical graphene according to claim 7, wherein the vertical graphene is dissociated from the growth substrate by an ultrasonic dissociation method.

10. A method of using the stretchable strain sensor based on vertical graphene according to claim 1, comprising:
   directly attaching to skin of a pregnant woman for monitoring the heart rate of the pregnant woman or a fetus in real time; or
   using it for artificial eardrum and identifying timbre; or
   attaching to human skin for pulse and recognizing pulse conditions, or for sensing movement of human joints or muscles; or
   using it for the skin of a robot, sensing contact or motion.

* * * * *